(12) United States Patent
Ishikawa et al.

(10) Patent No.: US 6,785,444 B2
(45) Date of Patent: Aug. 31, 2004

(54) OPTICAL FIBER GRATING DEVICE

(75) Inventors: Shinji Ishikawa, Yokohama (JP);
Masakazu Shigehara, Yokohama (JP);
Michiko Takushima, Yokohama (JP);
Tadashi Enomoto, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 51 days.

(21) Appl. No.: 10/129,276
(22) PCT Filed: Aug. 31, 2001
(86) PCT No.: PCT/JP01/07547
§ 371 (c)(1),
(2), (4) Date: Oct. 1, 2002
(87) PCT Pub. No.: WO02/33460
PCT Pub. Date: Apr. 25, 2002

(65) Prior Publication Data
US 2003/0103727 A1 Jun. 5, 2003

(30) Foreign Application Priority Data
Sep. 4, 2000 (JP) ........................................ 2000-267303

(51) Int. Cl.$^7$ ................................................. G02B 6/34
(52) U.S. Cl. ........................................................ 385/37
(58) Field of Search .......................... 385/37, 124, 144, 385/142, 126, 10

(56) References Cited

U.S. PATENT DOCUMENTS

| 5,703,978 | A | | 12/1997 | DiGiovanni et al. | |
|---|---|---|---|---|---|
| 5,742,723 | A | * | 4/1998 | Onishi et al. | 385/127 |
| 5,883,990 | A | * | 3/1999 | Sasaoka et al. | 385/37 |
| 6,151,438 | A | * | 11/2000 | Espindola et al. | 385/140 |
| 6,597,849 | B2 | * | 7/2003 | Ishikawa et al. | 385/127 |
| 6,661,958 | B2 | * | 12/2003 | Hirano et al. | 385/127 |
| 2003/0156809 | A1 | * | 8/2003 | Tsukitani et al. | 385/123 |
| 2004/0005130 | A1 | * | 1/2004 | Yamamotot et al. | 385/123 |

FOREIGN PATENT DOCUMENTS

| EP | 0905934 A2 | 3/1999 |
|---|---|---|
| JP | 63-121807 | 5/1988 |
| JP | 9-203816 | 8/1997 |
| JP | 9-205239 | 8/1997 |
| JP | 11-202139 | 7/1999 |
| JP | 2000-9956 | 1/2000 |
| WO | WO 97/26571 | 7/1997 |

OTHER PUBLICATIONS

Seiichi Shigehara et al., "Fiber Grating written through polymer coating", Japan, May 26, 2000, vol. 100, No. 85, pp. 1–6.
Yahei Koyamada et al., "Numerical Analysis of Core–Mode to Radiation–Mode Coupling in Long–Period Fiber Gratings", IEEE Photonics Technology Letters, Apr. 4, 2001, vol. 13, No. 4, pp. 308–310.

* cited by examiner

*Primary Examiner*—Thien M. Le
*Assistant Examiner*—Edwyn Labaze
(74) *Attorney, Agent, or Firm*—McDermott Will & Emery LLP

(57) ABSTRACT

An optical fiber grating device 1 is a device in which a long period grating 14 is formed in a core region 11 of an optical fiber 10 consisting of the core region 11 having a refractive index $n_1$ and an outside diameter $2a$, a first cladding region 12 surrounding the core region 11 and having a refractive index $n_2$ and an outside diameter $2b$, and a second cladding region 13 surrounding the first cladding region 12 and having a refractive index $n_3$ and an outside diameter $2c$. There is a magnitude relation of $n_1 > n_2 > n_3$ among the refractive index $n_1$ of the core region 11, the refractive index $n_2$ of the first cladding region 12, and the refractive index $n_3$ of the second cladding region 13, a relative refractive index difference $\Delta n_2$ of the first cladding region 12 to the second cladding region 13 is not less than 0.5%, and a thickness (c–b) of the second cladding region 13 with respect to a transmission loss peak wavelength λ is in a range of not less than λ nor more than 10λ.

5 Claims, 4 Drawing Sheets

OPTICAL FIBER GRATING DEVICE

This application is a 371 of PCT/JP01/07547 filed on Aug. 31, 2001.

TECHNICAL FIELD

The present invention relates to an optical component suitably applicable in optical communication and others and, more particularly, to an optical fiber grating device in which a long period grating is formed in the core region of optical fiber. The long period grating herein, for example as disclosed in U.S. Pat. No. 5,703,978, converts light of a selected wavelength out of the core mode propagating as confined in the core region, into cladding mode and radiates the cladding mode into the outside of the cladding region, different from short period gratings which reflect light of a selected wavelength.

BACKGROUND ART

The optical fiber grating devices with the long period grating in the core region of optical fiber are able to bring about coupling between the core mode of a predetermined wavelength and the cladding mode through periodic perturbations of the grating. Namely, the optical fiber grating devices transfer power of the core mode of the predetermined wavelength to the cladding mode on a wavelength selective basis. Here the core mode is a mode propagating as confined in the core region of optical fiber. On the other hand, the cladding mode is a mode radiated into the cladding region around the core region, without being confined in the core region of optical fiber. Such optical fiber grating devices have been used as optical fiber filters in the fields of optical communications, selectively cutting off core mode of a predetermined wavelength (transmission loss peak wavelength) from among those of a certain wavelength band having propagated in optical fiber.

The cladding mode is a mode taking account of the entire fiber region defined at the interface between the cladding region and an outer layer such as an air layer or a coating layer. Accordingly, a change in the refractive index of the outer layer results in shifting the wavelength of coupling between core mode and cladding mode, i.e., the transmission loss peak wavelength and also changing the transmission loss of the core mode at the transmission loss peak wavelength. Particularly, where the optical fiber is coated with a resin having a refractive index close to that of glass, no cladding mode is formed, so as to result in no transmission loss peak wavelength in the optical fiber grating device. For this reason, the optical fiber grating device had the problem that the coating intended for protection thereof was not applicable.

The optical fiber grating device disclosed in Japanese Patent Application Laid-Open No. 11-326654 is one proposed in order to solve this problem, in which the long period grating is formed in a silica-based single-mode fiber having a refractive index profile of dual shape core (DSC) structure. Here the refractive index profile of DSC structure is of a structure including a first core region with a refractive index $n_1$, a second core region with a refractive index $n_2$, and a cladding region with a refractive index $n_3$ in the order named from the center of the optical axis (where $n_1 > n_2 > n_3$). This optical fiber grating device is a device wherein $GeO_2$ is added to both the first core region and the second core region of the optical fiber and they are exposed to spatially intensity-modulated ultraviolet light to form index modulation or a grating across these two regions. In this optical fiber grating device, the core mode of a predetermined wavelength propagating in the first core region is coupled with a higher order mode propagating in both the first core region and the second core region to cut off the core mode of the predetermined wavelength.

The aforementioned Application describes that the preferred refractive index profile in the optical fiber grating device as disclosed in the Application is such that the relative refractive index difference of the first core region is in the range of 0.8% to 1.0%, the relative refractive index difference of the second core region in the range of 0.05% to 0.15%, the radius of the first core region in the range of 3.2 μm to 3.8 μm, and the radius of the second core region in the range of 17 μm to 20 μm.

DISCLOSURE OF THE INVENTION

The inventors investigated the above-stated prior art and found the following problem.

Namely, since this optical fiber grating device includes few higher modes propagating in both the first core region and the second core region, the number of transmission loss peaks is approximately 1 or 2 in the operating wavelength band. Accordingly, freedom of setting the grating period becomes small, when the grating period is set in formation of the grating so as to yield a desired transmission loss peak wavelength in the optical fiber grating device. Since the coupling coefficient is large between the core mode of the predetermined wavelength propagating in the first core region and the higher order mode propagating in both the first core region and the second core region, change is large in the transmission loss and the transmission loss peak wavelength against increase of refractive index due to the exposure to the ultraviolet light and it is thus difficult to achieve control to satisfy both the predetermined transmission loss and the transmission loss peak wavelength.

The present invention has been accomplished in order to solve the above problem and an object of the invention is to provide an optical fiber grating device giving high degrees of freedom in the setting of the grating period and permitting easy control of the transmission loss and the transmission loss peak wavelength.

An optical fiber grating device according to the present invention is an optical fiber grating device in which a long period grating is formed in a core region of an optical fiber comprising a core region having a refractive index $n_1$ and an outside diameter $2a$, a first cladding region surrounding the core region and having a refractive index $n_2$ and an outside diameter $2b$, and a second cladding region surrounding the first cladding region and having a refractive index $n_3$ and an outside diameter $2c$. There is a magnitude relation of $n_1 > n_2 > n_3$ among the refractive index $n_1$ of the core region, the refractive index $n_2$ of the first cladding region, and the refractive index $n_3$ of the second cladding region. A relative refractive index difference of the first cladding region to the second cladding region is not less than 0.5%. A thickness (c−b) of the second cladding region with respect to a transmission loss peak wavelength λ is in a range of not less than λ nor more than 10λ.

This optical fiber grating device includes many transmission loss peaks in a predetermined wavelength band (e.g., 1.2 μm to 1.8 μm) and the spacing is small between the transmission loss peaks. The coupling coefficient is small between the core mode and the higher order mode propagating in the first cladding region, so that variation is reduced in the transmission loss and the transmission loss peak wavelength against refractive index change. Further, there is little influence from the outer layer outside the second cladding region, the transmission loss characteristics are stable, and the excellent cutoff effect is achieved in the grating. Accordingly, freedom of setting the grating period becomes large, controlling of the transmission loss and the transmission loss peak wavelength gets easy, and excellent transmission loss characteristics is obtained in this optical fiber grating device.

In the optical fiber grating device according to the present invention, the relative refractive index difference of the first cladding region to the second cladding region is preferably not less than 0.5% nor more than 1.5%. When the second cladding region is doped with the fluorine (F) element, the refractive index $n_3$ of the second cladding region can be made lower than the refractive index $n_2$ of the first cladding region and the relative refractive index difference of the first cladding region to the second cladding region can be increased up to 1.5%.

In the optical fiber grating device according to the present invention, a resin coating having a refractive index $n_4$ (where $n_4 > n_2$) is preferably provided around the second cladding region. This configuration favorably facilitates guiding of higher order mode generated by mode coupling at the transmission loss peak wavelength to the outside of the optical fiber. This structure is also preferable in terms of protection of the optical fiber grating device.

In the optical fiber grating device according to the present invention, the outside diameter $2b$ of the first cladding region is preferably not less than 100 μm. This configuration is preferable in that the number of transmission loss peaks is large and also preferable in that the excellent cutoff effect is obtained.

In the optical fiber grating device according to the present invention, a mode field diameter of fundamental mode propagating in the core region is preferably not more than one tenth of the outside diameter $2b$ of the first cladding region. This configuration is preferable in that the number of transmission loss peaks is large and also preferable in that the excellent cutoff effect is obtained.

The present invention can be better understood by the detailed description and the accompanying drawings which will follow. It is noted that these are to be considered simply illustrative of the invention, but are not to be considered restrictive to the present invention.

BEST MODE FOR CARRYING OUT THE INVENTION

An embodiment of the present invention will be described below in detail with reference to the accompanying drawings. The same reference symbols will denote the same or similar elements throughout the description of the drawings and redundant description will be omitted.

Figure 1:
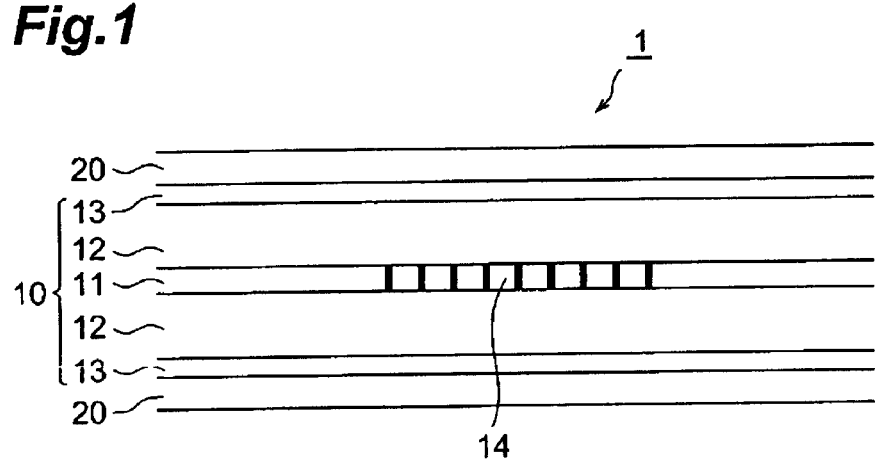
FIG. 1 is a sectional view of an optical fiber grating device as an embodiment of the present invention, which is a cross section of the grating device cut by a plane including the optical axis.
Figure 2:
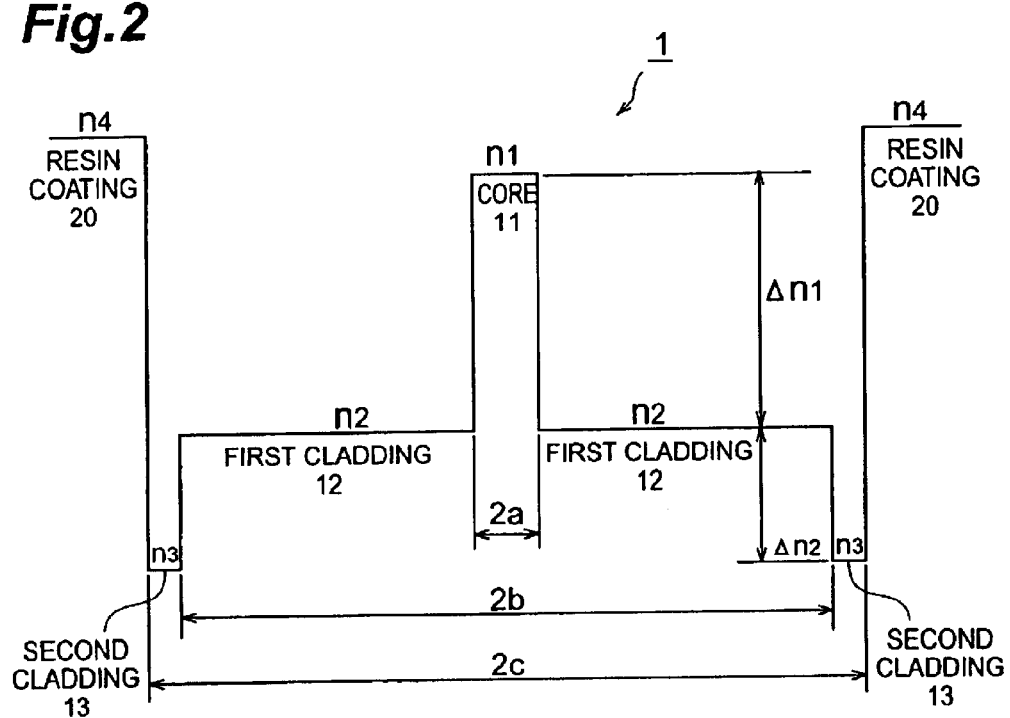
FIG. 2 is a view showing a refractive index profile of the optical fiber grating device of the embodiment.

FIG. 1 is a sectional view of the optical fiber grating device 1 as an embodiment of the present invention, which is a cross section of the grating device cut by a plane including the optical axis of an optical fiber 10. FIG. 2 is a view showing a refractive index profile of the optical fiber grating device 1 of the present embodiment. The optical fiber grating device 1 of the present embodiment is a device in which a long period grating 14 is formed in the optical fiber 10 having a core region 11, a first cladding region 12, and a second cladding region 13 in the order named from the center of the optical axis and in which a resin coating 20 is provided around the optical fiber 10.

The core region 11 of the optical fiber 10 includes the center of the optical axis and has the refractive index $n_1$ and the outside diameter $2a$, and the long period grating 14 is formed in a predetermined area of the core region 11. The first cladding region 12 surrounds the core region 11 and has the refractive index $n_2$ and the outside diameter $2b$. The second cladding region 13 surrounds the first cladding region 12 and has the refractive index $n_3$ and the outside diameter $2c$ (normally, 125 μm). The resin coating 20 is provided around the second cladding region 13 and has the refractive index $n_4$.

There are magnitude relations of $n_1 > n_2 > n_3$ and $n_4 > n_2$ among the refractive indices of the core region 11, the first cladding region 12, the second cladding region 13, and the resin coating 20. The relative refractive index difference $\Delta n_2$ of the first cladding region 12 to the second cladding region 13 is not less than 0.5% and preferably not more than 1.5%. The relative refractive index difference $\Delta n_2$ (%) of the first cladding region 12 to the second cladding region 13 is expressed by the following equation:

$$\Delta n_2 = 100 \times (n_2 - n_3)/n_2 \qquad (1).$$

The relative refractive index difference $\Delta n_1$ (%) of the core region 11 to the first cladding region 12 is expressed by the following equation:

$$\Delta n_1 = 100 \times (n_1 - n_2)/n_1 \qquad (2).$$

The thickness (c–b) of the second cladding region 13 is not less than λ and not more than 10λ, where λ is transmission loss peak wavelength. And more preferably, the thickness (c–b) is not less than 1.5λ and not more than 10λ. Preferably, the outside diameter $2b$ of the first cladding region 12 is not less than 100 μm and the mode field diameter of the fundamental mode propagating in the core region 11 is not more than one tenth of the outside diameter $2b$ of the first cladding region 12.

When the relative refractive index difference $\Delta n_2$ of the first cladding region 12 is not less than 0.5% as described above, the number of transmission loss peaks is 4 or more in a predetermined wavelength band (e.g., 1.2 μm to 1.8 μm) and the spacing is not more than 0.2 μm between the transmission loss peaks. When the thickness (c–b) of the second cladding region 13 with respect to the transmission loss peak wavelength λ is not less than λ, there is little influence from the outer layer outside the second cladding region 13 and the transmission loss characteristics become stable. When the thickness (c–b) of the second cladding region 13 is not more than 10λ, the higher order mode generated by the mode coupling at the transmission loss peak wavelength is guided to the outside of the optical fiber 10 and the cutoff effect becomes superior in the grating 14. When the device is designed as described above, the coupling coefficient becomes small between the core mode and the higher order mode propagating in the first cladding region and the variation is reduced in the transmission loss and transmission loss peak wavelength against refractive index change. Accordingly, freedom of setting the grating period becomes large, controlling of the cutoff rate and transmission loss peak wavelength gets easy, and excellent transmission loss characteristics is obtained in this optical fiber grating device 1.

When the thickness (c–b) of the second cladding region 13 is not less than 1.5λ, the device reduces the wavelength dependence of the higher order mode guided to the outside of the optical fiber 10, which is preferable. When the refractive index $n_4$ of the resin coating 20 provided around the second cladding region 13 is greater than the refractive index $n_2$ of the first cladding region 12, it becomes easier for the higher order mode generated by the mode coupling at the transmission loss peak wavelength, to go out to the outside of the optical fiber 10, which is preferable. When the outside diameter 2b of the first cladding region 12 is not less than 100 μm, the configuration is preferable in that the number of transmission loss peaks is large and is also preferable in that the cutoff effect is excellent. When the mode field diameter of the fundamental mode propagating in the core region 11 is not more than one tenth of the outside diameter 2b of the first cladding region 12, the configuration is preferable in that the number of transmission loss peaks is large and also in that the cutoff effect is excellent.

The optical fiber grating device 1 as described is produced, for example, as follows. First prepared is the silica glass base optical fiber 10 in which the core region 11 is doped with $GeO_2$ and the second cladding region 13 with the fluorine (F) element. An ultraviolet laser beam from a KrF excimer laser source is irradiated through an intensity-modulated mask of fixed period to the optical fiber 10 to form the long period grating 14 therein. Then the resin coating 20 is provided around the fiber 10.

Figure 3:
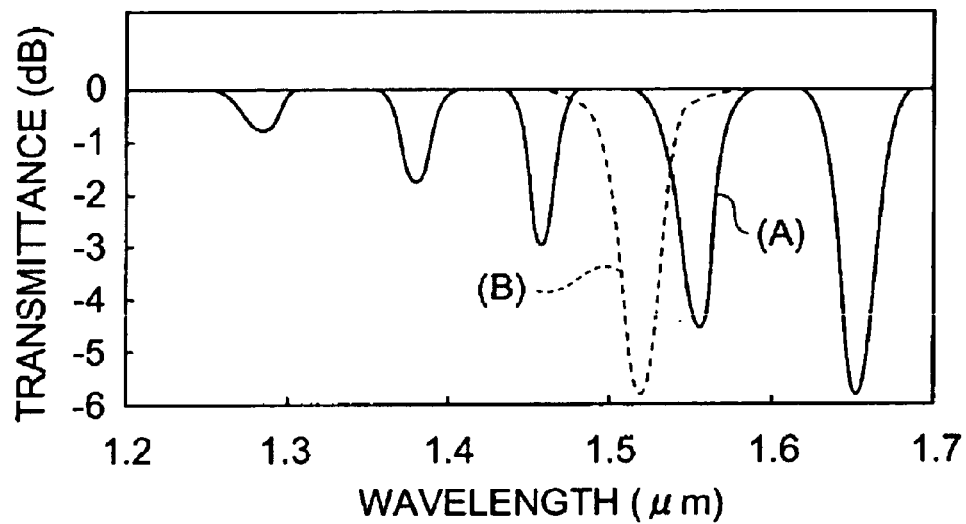
FIG. 3 is a graph showing a transmission spectrum of the optical fiber grating device.

FIG. 3 is a graph showing a transmission spectrum of the optical fiber grating device 1. In this graph, a solid line (A) represents the transmission spectrum of the optical fiber grating device 1 of the embodiment and a dashed line (B) a transmission spectrum of a conventional optical fiber grating device. The optical fiber 10 prepared herein was one wherein the core region 11 had the outside diameter 2a of 3.5 μm, the first cladding region 12 had the outside diameter 2b of 105 μm, the second cladding region 13 had the outside diameter 2c of 125 μm, the relative refractive index difference $\Delta n_1$ of the core region 11 to the first cladding region 12 was 1.1%, and the relative refractive index difference $\Delta n_2$ of the first cladding region 12 to the second cladding region 13 was 0.7%. With the intensity-modulated mask having the pitch of 410 μm, the grating 14 was formed in the grating length of 30 mm in the core region 11 of the optical fiber 10 to obtain the optical fiber grating device 1. A light source was connected to one end of the optical fiber grating device 1 while a spectrum analyzer was connected to the other end of the optical fiber grating device 1. In this state the transmission spectrum of this optical fiber grating device 1 was measured. As apparent from this graph, in the wavelength band of 1.2 μm to 1.7 μm, the conventional optical fiber grating device has one transmission loss peak wavelength, whereas the optical fiber grating device 1 of the embodiment has five transmission loss peak wavelengths.

Figure 4:
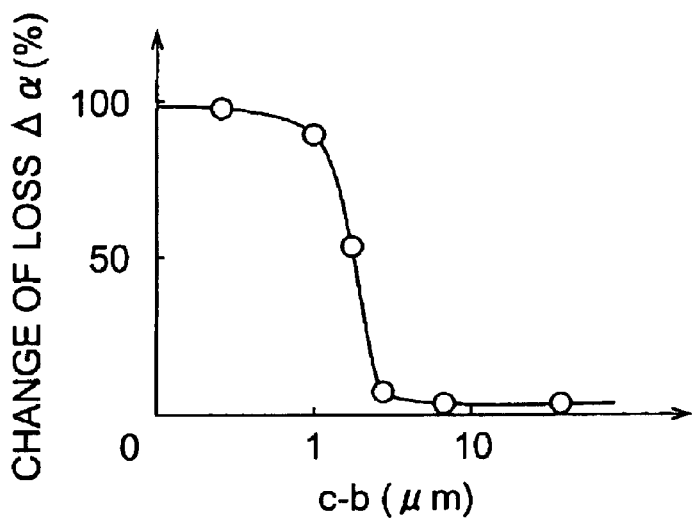
FIG. 4 is a graph showing a relation between loss change $\Delta\alpha$ and the thickness (c–b) of the second cladding region in the optical fiber grating device.

FIG. 4 is a graph showing a relation between the percentage of loss change Δα and the thickness (c–b) of the second cladding region 13 in the optical fiber grating device 1. The horizontal axis of this graph is of the logarithmic scale. The percentage of loss change Δα (%) is expressed by the following equation:

$$\Delta\alpha = 100 \times (\alpha_2 - \alpha_1)/\alpha_2 \quad (3),$$

where the loss $\alpha_1$ is a value measured at the loss peak wavelength in the 1.55 μm wavelength band in the configuration without the resin coating 20 around the optical fiber 10 and thus with air (refractive index 1.0) instead around the optical fiber 10 and the loss $\alpha_2$ is a value measured at the loss peak wavelength in the 1.55 μm wavelength band in the configuration with matching oil (having the refractive index of 1.45 approximately equal to that of silica glass) around the optical fiber 10. The percentage of loss change Δα is preferably as small as possible, in order to decrease the change of loss. The outside diameter 2a of the core region 11 was 3.5 μm, the outside diameter 2c of the second cladding region 13: 125 μm, the relative refractive index difference $\Delta n_1$ of the core region 11: 1.1%, and the relative refractive index difference $\Delta n_2$ of the first cladding region 12: 0.7%. The outside diameter 2b of the first cladding region 12 was either of the values in the graph.

As apparent from this graph, the percentage of loss change Δα suddenly decreases as the thickness (c–b) of the second cladding region 13 exceeds 1 μm. When this is expressed with respect to the transmission loss peak wavelength λ, the thickness (c–b) of the second cladding region 13 is preferably not less than λ, because the percentage of loss change Δα is small in the specified range. The grating 14 formed in the core region 11 of the optical fiber grating device 1 needs to be a long period grating that can expel the higher order mode generated by the mode coupling at the transmission loss peak wavelength, to the outside of the optical fiber. However, if the thickness (c–b) of the second cladding region 13 is too large, the higher order mode will propagate in the second cladding region 13 to weaken cutoff effect at the grating 14. Therefore, the thickness (c–b) of the second cladding region 13 is preferably not more than 10λ.

Figure 5:
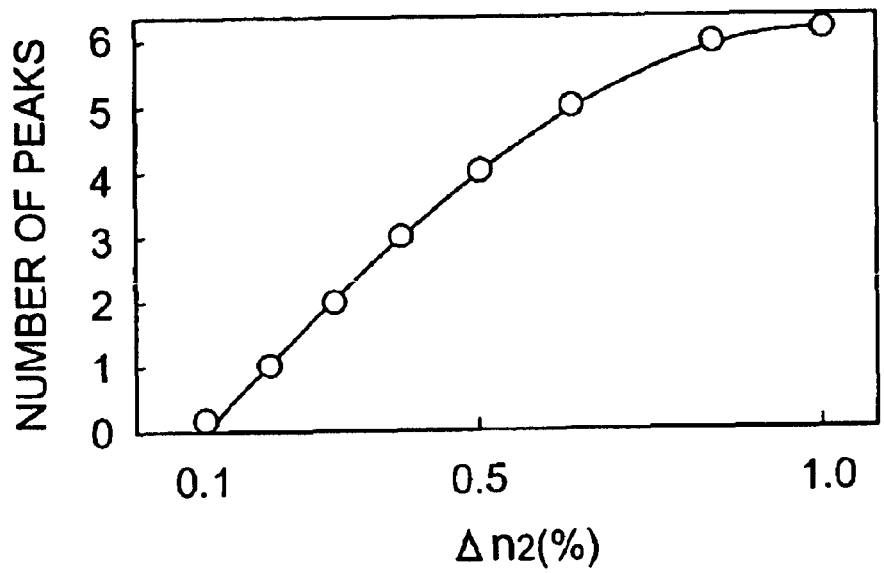
FIG. 5 is a graph showing a relation between the number of transmission loss peaks and the relative refractive index difference $\Delta n_2$ of the first cladding region in the optical fiber grating device.

FIG. 5 is a graph showing a relation between the number of transmission loss peaks and the relative refractive index difference $\Delta n_2$ of the first cladding region 12 in the optical fiber grating device 1. The optical fibers 10 prepared herein were those having the outside diameter 2a of the core region 11: 3.5 μm, the outside diameter 2b of the first cladding region 12: 105 μm, the outside diameter 2c of the second cladding region 13: 125 μm, and the relative refractive index difference $\Delta n_1$ of the core region 11: 1.1%. The fluorine was added in either of various doping amounts in the first cladding region 12 to produce the optical fibers with respective values of the relative refractive index difference $\Delta n_2$ of the first cladding region 12. The number of transmission loss peaks represents the number of transmission loss peaks in the wavelength band of 1.2 μm to 1.8 μm. As apparent from this graph, the number of transmission loss peaks becomes larger as the relative refractive index difference $\Delta n_2$ of the first cladding region 12 increases. When the relative refractive index difference $\Delta n_2$ of the first cladding region 12 is not less than 0.5%, the number of transmission loss peaks is 4 or higher in the wavelength band of 1.2 μm to 1.8 μm and the spacing between the transmission loss peaks is not more than 0.2 μm, which is preferable.

Figure 6:
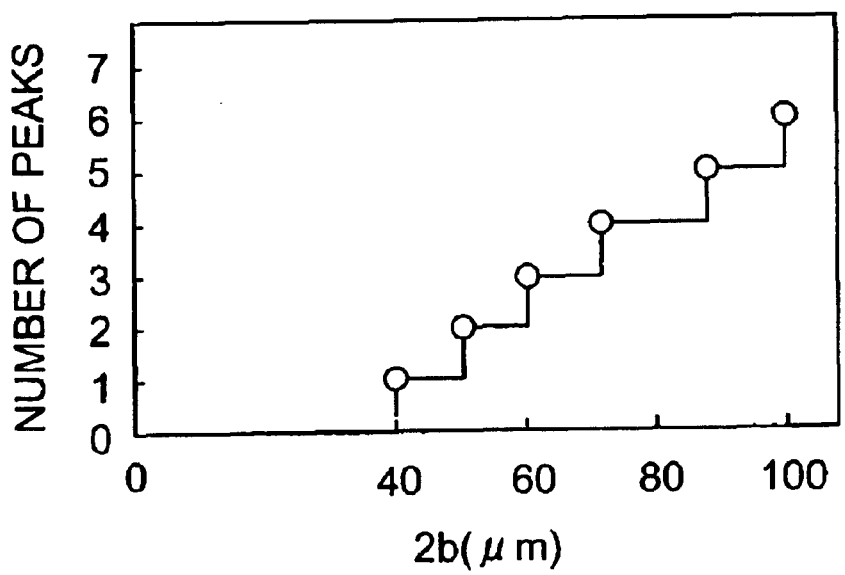
FIG. 6 is a graph showing a relation between the number of transmission loss peaks and the outside diameter $2b$ of the first cladding region in the optical fiber grating device.

FIG. 6 is a graph showing a relation between the number of transmission loss peaks and the outside diameter 2b of the first cladding region 12 in the optical fiber grating device 1. The optical fibers 10 prepared herein were those having the outside diameter 2a of the core region 11: 3.5 μm, the outside diameter 2c of the second cladding region 13: 125 μm, the relative refractive index difference $\Delta n_1$ of the core region 11: 1.1%, and the relative refractive index difference $\Delta n_2$ of the first cladding region 12: 0.7%. The optical fibers were produced with respective values of the outside diameter 2b of the first cladding region 12. The number of transmission loss peaks represents the number of transmission loss peaks in the wavelength band of 1.2 μm to 1.8 μm. As apparent from this graph, the number of transmission loss peaks increases as the outside diameter 2b of the first cladding region 12 increases. When the outside diameter 2b of the first cladding region 12 is not less than 60 μm, the number of transmission loss peaks is 3 or higher; when the outside diameter 2b of the first cladding region 12 is not less than 72 μm, the number of transmission loss peaks is 4 or higher; when the outside diameter 2b of the first cladding region 12 is not less than 100 μm, the number of transmission loss peaks is 6 or higher. Since the thickness (c–b) of the second cladding region 13 needs to be not more than 10λ as described previously, it is preferable that the outside diameter 2b of the first cladding region 12 be not less than 100 μm when the outside diameter 2c of the second cladding region 13 is 125 μm.

Figure 7:
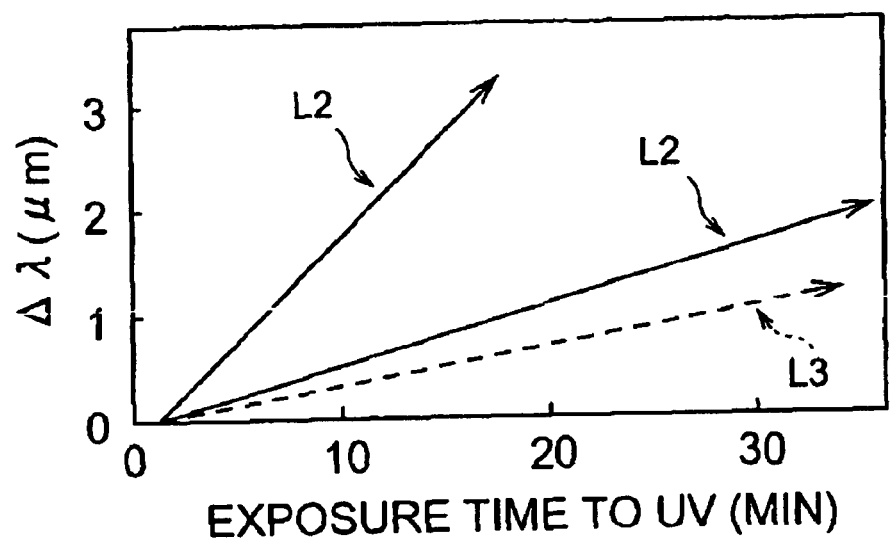
FIG. 7 is a graph showing a relation between deviation $\Delta\lambda$ of transmission loss peak wavelength and exposure time to ultraviolet light in formation of the grating in the optical fiber grating device.

FIG. 7 is a graph showing a relation between deviation Δλ of the transmission loss peak wavelength and the exposure time to the ultraviolet light in the formation of the grating 14 in the optical fiber grating device 1. This figure also shows Comparative Example 1 (indicated by L2) and Comparative Example 2 (indicated by L3) in addition to Example (indicated by L1). The optical fibers 10 prepared in Example were those having the outside diameter 2a of the core region 11: 3.5 μm, the outside diameter 2b of the first cladding region 12: 105 μm, the outside diameter 2c of the second cladding region 13: 125 μm, the relative refractive index difference $\Delta n_1$ of the core region 11: 1.1%, and the relative refractive index difference $\Delta n_2$ of the first cladding region 12: 0.7%. The optical fibers prepared in Comparative Example 1 were those having the refractive index profile shown in FIG. 2, but having the outside diameter 2a of the core region 11: 3.5 μm, the outside diameter 2b of the first cladding region 12: 40 μm, the outside diameter 2c of the second cladding region 13: 125 μm, the relative refractive index difference $\Delta n_1$ of the core region 11: 1.1%, and the relative refractive index difference $\Delta n_2$ of the first cladding region 12: 0.3%. The optical fibers prepared in Comparative Example 2 were those having a simple refractive index profile consisting of a core region and a cladding region, in which the outside diameter of the core region was 3.5 μm, the outside diameter of the cladding region 125 μm, and the relative refractive index difference of the core region 1.1%. In all of Example, Comparative Example 1, and Comparative Example 2, the pitch of the intensity-modulated mask was 410 μm and the irradiation power of ultraviolet light was identical.

As apparent from this graph, in all of Example, Comparative Example 1, and Comparative Example 2, the transmission loss peak wavelength deviates to the longer wavelength side with increase in the exposure time to the ultraviolet light, so as to increase the deviation Δλ of the transmission loss peak wavelength. The increase of the deviation Δλ of the transmission loss peak wavelength against the exposure time to ultraviolet light in Example is smaller than that in the case of Comparative Example 1 and approximately equal to that in the case of Comparative Example 2. Accordingly, the present embodiment ensures a wide range of exposure time to ultraviolet light to achieve the desired transmission loss peak wavelength and transmission loss in the formation of the grating 14, thus facilitating attainment of the desired transmission loss peak wavelength and transmission loss.

INDUSTRIAL APPLICABILITY

In the optical fiber grating device of the present invention, the number of transmission loss peaks is large in the predetermined wavelength band (e.g., 1.2 μm to 1.8 μm) and the spacing is small between the transmission loss peaks. The coupling coefficient is also small between the core mode and the higher order mode propagating in the first cladding region, so that variation is reduced in the transmission loss and transmission loss peak wavelength against refractive index change. Further, there is little influence from the outer layer outside the second cladding region and the transmission loss characteristics are stable, so as to achieve the excellent cutoff effect in the grating. Accordingly, the optical fiber grating device provides high degrees of freedom in the setting of the grating period and permits easy control of the transmission loss and transmission loss peak wavelength, so as to be superior in the transmission loss characteristics.

It is obvious that the present invention can be modified or changed in various ways, from the above description of the present invention. Such modifications and changes are to be considered not to depart from the essence and scope of the present invention, and all improvements obvious to those skilled in the art are to be considered to fall within the scope of the claims which follow.

What is claimed is:

1. An optical fiber grating device in which a long period grating is formed in a core region of an optical fiber comprising the core region having a refractive index $n_1$ and an outside diameter 2a, a first cladding region surrounding the core region and having a refractive index $n_2$ and an outside diameter 2b, and a second cladding region surrounding the first cladding region and having a refractive index $n_3$ and an outside diameter 2c, wherein there is a magnitude relation of $n_1 > n_2 > n_3$ among the refractive index $n_1$ of the core region, the refractive index $n_2$ of the first cladding region, and the refractive index $n_3$ of the second cladding region, wherein a relative refractive index difference of the first cladding region to the second cladding region is not less than 0.5%, and wherein a thickness $(2c-2b)/2$ of the second cladding region with respect to a transmission loss peak wavelength λ is in a range of not less than λ nor more than 10λ.

2. The optical fiber grating device according to claim 1, wherein the relative refractive index difference of the first cladding region to the second cladding region is not less than 0.5% nor more than 1.5%.

3. The optical fiber grating device according to claim 1, wherein a resin coating having a refractive index $n_4$ (where $n_4 > n_2$) is provided around said second cladding region.

4. The optical fiber grating device according to claim 1, wherein the outside diameter 2b of the first cladding region is not less than 100 μm.

5. The optical fiber grating device according to claim 1, wherein a mode field diameter of fundamental mode propagating in the core region is not more than one tenth of the outside diameter 2b of the first cladding region.

* * * * *